US007016508B1

(12) United States Patent
Phelps

(10) Patent No.: US 7,016,508 B1
(45) Date of Patent: Mar. 21, 2006

(54) AUDIO APPARATUS

(75) Inventor: Andrew Phelps, Southhampton (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/576,039

(22) Filed: May 23, 2000

(30) Foreign Application Priority Data

Jun. 14, 1999 (GB) .................................... 9913848

(51) Int. Cl.
*H04B 3/00* (2006.01)

(52) U.S. Cl. ........................................ 381/77; 367/132

(58) Field of Classification Search .................. 381/77, 381/150, 173, 98, 103; 367/132
See application file for complete search history.

(56) References Cited

U.S. PATENT DOCUMENTS

| | | | |
|---|---|---|---|
| 4,823,908 A | 4/1989 | Tanaka et al. | |
| 5,307,302 A | 4/1994 | Nakano | |
| 5,539,705 A * | 7/1996 | Akerman et al. | 367/132 |
| 5,889,870 A | 3/1999 | Norris | 381/77 |
| 6,229,899 B1 | 5/2001 | Norris et al. | 381/77 |

FOREIGN PATENT DOCUMENTS

| | | |
|---|---|---|
| EP | 0273425 | 7/1988 |
| JP | 58119293 | 7/1983 |
| JP | 6075199 | 4/1985 |
| JP | 60201799 | 10/1985 |
| JP | 03252233 | 2/1992 |
| JP | 08167924 | 6/1996 |

OTHER PUBLICATIONS

U.S. Appl. No. 09/116,271, filed Jul. 16, 1998, F. Pompei.
F. Joseph Pompei, The Use of Airborne Ultrasonics For Generating Audible Sound Beams, MIT Media Lab, Cambridge MA, USA, (Proceedings of 105th AES Convention, San Francisco, CA), Sep. 1998, 13 pages.
Thomas Kite et al, Parametric Array in Air: Distortion Reduction by Preprocessing, date unknown 2, pages.
HyperSonic Sound-Introduction to Hyperson Sound Technology, www.atcsd.com/HTML/whitepaper.html, Apr. 1999, 10 pages.

* cited by examiner

*Primary Examiner*—Xu Mei
*Assistant Examiner*—Con P. Tran
(74) *Attorney, Agent, or Firm*—Antonelli, Terry, Stout & Kraus, LLP

(57) ABSTRACT

An audio apparatus comprising a modulator 12 for modulating a first ultrasonic signal 29 with an audio signal to provide a second ultrasonic signal 30; a transducer 15 for converting the second ultrasonic signal 30 into an ultrasonic pressure wave for transmission into a non-linear medium to allow demodulation of the ultrasonic pressure wave and thereby generate an audio pressure wave representative of the audio signal 29, processing means 11 for modifying the audio signal to compensate for the demodulating properties of the non-linear medium; and means 8 for modifying the audio signal to compensate for the conversion characteristics of the transducer 15.

21 Claims, 4 Drawing Sheets

AUDIO APPARATUS

BACKGROUND OF THE INVENTION

This invention relates to audio apparatus, and in particular audio apparatus for radiating an ultrasonic pressure wave with a modulated audio signal.

Audio spotlighting, using a parametric audio system, provides a means for projecting highly directional beams of audible sound. This technology employs the non-linearity of a compressible material (such as air) to create audible by-products from inaudible ultrasound. This technique exploits an acoustic phenomenon called self-demodulation where low frequency audio beams of high directivity are generated from a high amplitude ultrasonic beam that has been modulated with an audio signal. Self-demodulation generates new frequencies in the received sound spectra based on the envelope frequency (i.e. the required audio signal) in a process akin to AM demodulation. Thus this technique provides a beam of audio sound with the focused directional properties of the original ultrasonic carrier beam, allowing distant targeting of specific listeners. This technique can produce predictable and controllable levels of audio sound and, despite the relatively weak effect of self-demodulation, is capable of generating substantial sound amplitudes due to the narrow spatial distribution of the acoustic energy.

The transmitted modulated ultrasonic wave can be considered as a collimated primary wave consisting of an amplitude modulated wave of pressure where the primary pressure wave is defined by 1) $p_1 = P_1 E(t)\sin(\omega_c t)$ where $P_1$ is the amplitude of the primary beam pressure, $\omega_c$ is the carrier frequency and E(t) is the modulation envelope. For an amplitude modulated signal E(t) is equal to (1+mg(t)) where m is the modulation depth and g(t) is the audio signal.

As a result of $p_1$ interacting with the air the modulated audio signal demodulates creating an audible secondary pressure wave $p_2$ given by $$p_2(t) = \frac{\beta P_1^2 A}{16\pi\rho_0 c_0^4 z\alpha}\frac{\partial^2}{\partial t^2}E^2(\tau) \quad 2)$$

where β is the coefficient of nonlinearity ($\beta_{air}$=1.2), $\rho_0$ is the ambient density of the medium, $c_0$ is the small signal wave propagation speed, A is the beam's cross-sectional area, z is the axial distance, α is the absorption coefficient of the medium. So, for example, where c=343 m/s, $\rho_0$=1.2 kg/m$^3$, α=0.6, and A=5×10 m$^{-3}$, a 140 dB ultrasound wave modulated with a 1 kHz signal would produce about 71 dB of audible sound at 1 m.

The power of the resultant audio signal is proportional to the second derivative of the square of the modulation envelope. As a result significant coloration (i.e. a shift of signal power with respect to frequency) and distortion are introduced onto the demodulated audio signal as a result of the interaction of the ultrasonic wave with the non-linear medium. The coloration of the signal results in the low frequency audio components being suppressed by approximately 12 dB/octave; this is represented by the second derivative term of the modulation envelope. The distortion of the signal is represented by the square of the modulation envelope.

Processing the audio signal prior to modulation can minimize the effects of coloration and distortion that result from the interaction of the ultrasonic wave with the non-linear medium. The processing typically comprises a double integration filter to compensate for coloration of the audio signal and a square root operation to compensate for the distortion of the audio signal.

However, for the self-demodulation to occur high ultrasonic sound pressure levels are required. To generate these high pressure levels it is necessary to generate the ultrasonic pressure levels at or close to the resonant frequency of the transmitting transducer. Correspondingly the frequency response of the transducer can vary dramatically at this frequency. The variable transducer frequency response can significantly affect the quality of the demodulated audio pressure wave.

FIG. 1, plot A shows the frequency spectrum of a white noise input signal constrained between 300 and 4000 Hz prior to modulation with an ultrasonic carrier signal. An example of the effects of self-demodulation and transducer conversion upon the input signal, using a typical transducer having a measured frequency response shown in FIG. 2, is shown in FIG. 1, plot B.

The frequency response of a transducer can be flattened at the resonant frequency. However this requires considerable damping to be added to the transducer, and a corresponding drop in ultrasonic pressure level. This in turn would require a transducer with a large radiating surface area, which is not suitable for small devices, for example a mobile communication device and in particular a radiotelephone.

SUMMARY OF THE INVENTION

In accordance with an aspect of the present invention there is provided audio apparatus comprising a modulator for modulating a first ultrasonic signal with an audio signal to provide a second ultrasonic signal; a transducer for converting the second ultrasonic signal into an ultrasonic pressure wave for transmission into a non-linear medium to allow demodulation of the ultrasonic pressure wave and thereby generate an audio pressure wave representative of the audio signal; processing means for modifying the audio signal to compensate for the demodulating properties of the non-linear medium; and means for modifying the audio signal to compensate for the conversion characteristics of the transducer.

This provides the advantage of enabling the effects of the demodulation process and the transducer conversion characteristics on the audio signal to be minimized. This can allow the size of the transducer to be reduced while retaining the performance of the transducer.

Typically the means for modifying the audio signal to compensate for the conversion characteristics of a transducer is a transducer response filter.

Most preferably the processing means comprises a double integration filter and a square root operator. As the operator processes the audio signal non-linearly, the characteristics of the second filter are preferably derived empirically by tone adjustment for the required frequency range of the audio signal.

The invention will now be described, by way of one example only, with reference to the accompanying drawings, in which:

BRIEF DESCRIPTION OF THE DRAWINGS

FIG. 1, plot B shows the frequency spectrum of FIG. 1, plot A after self-demodulation without correction;

FIG. 5, plot B shows the frequency spectrum of the test audio signal output from audio apparatus according to an embodiment of the present invention.

DETAILED DESCRIPTION OF THE INVENTION

Figure 3:
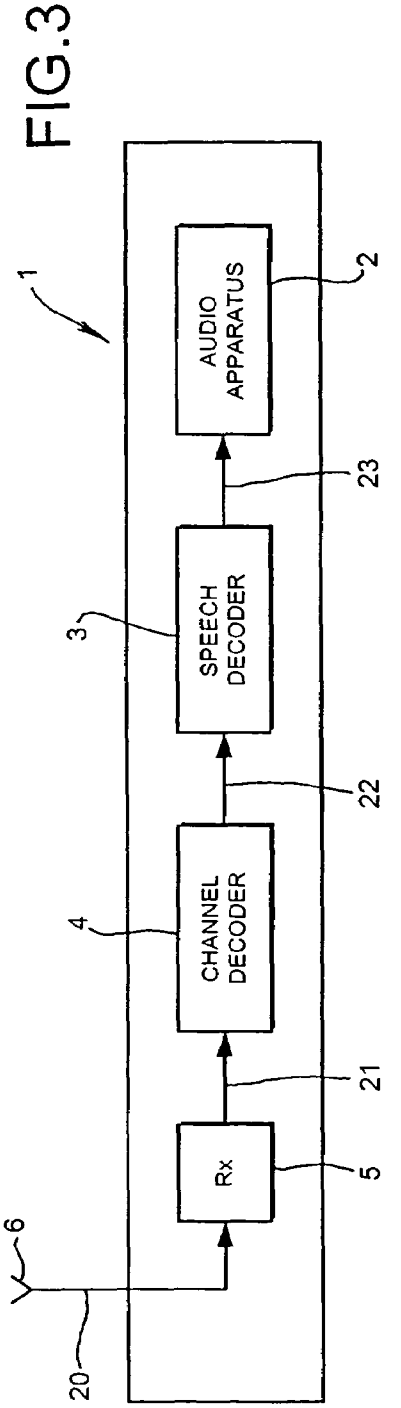
FIG. 3 shows a radiotelephone having audio apparatus according to an embodiment of the present invention.

FIG. 3 shows a radiotelephone 1 with audio apparatus 2, a speech decoder 3, a channel decoder 4, a receiver 5 and an antenna 6. In operation the receiver 5 receives a speech encoded digital signal 20 from a base station (not shown) via antenna 6. The receiver 5 demodulates the received digital signal 20 and passes the demodulated signal 21 to channel decoder 4 which corrects for errors that may have occurred during the transmission process by using error protection bits encoded within the received signal. The receiver 5 typically samples the received signal 20 at 8 kHz. The decoded digital signal 22 is provided to speech decoder 3 which decodes the speech and passes the digital decoded signal 23 to audio apparatus 2 to generate an acoustic representation of the received speech signal as described in detail below. The audio apparatus 2 may be mounted within the radiotelephone 1. Typically however, to obtain the required audio power levels and to support hands free use of the radiotelephone 1, the audio apparatus 2 is mounted separately to the radiotelephone 1, for example, in conjunction with a hands free kit or a car kit for hands free use of a radiotelephone in a car.

Figure 4:
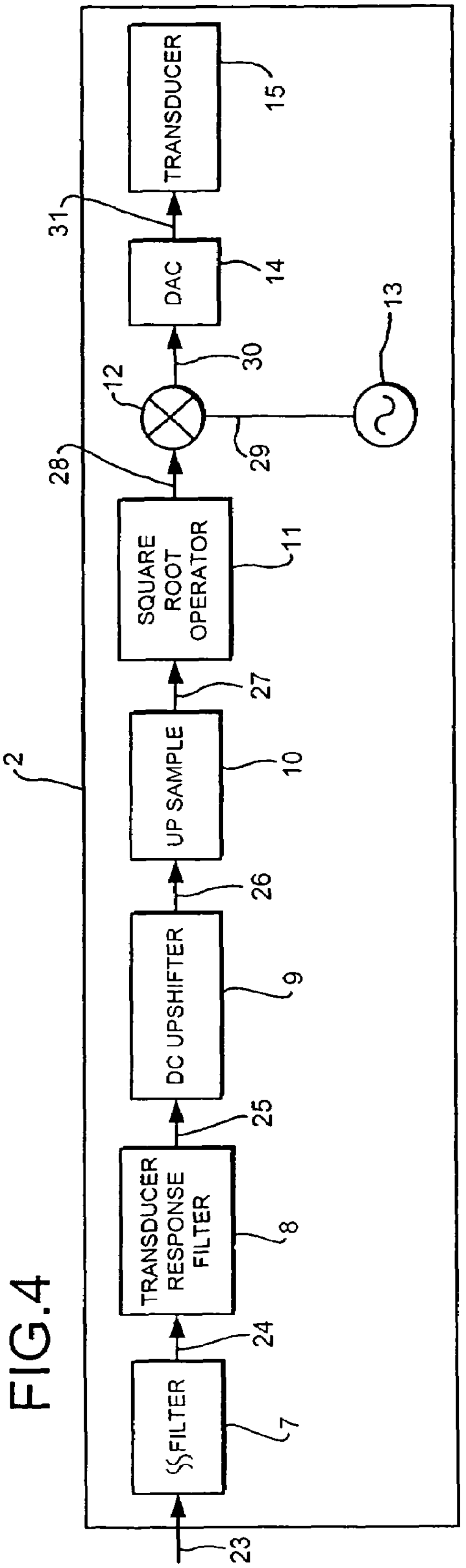
FIG. 4 shows audio apparatus according to an embodiment of the present invention.

FIG. 4 shows the audio apparatus 2 which comprises a double integration filter 7, a transducer response filter 8, a DC up-shifter 9, an up-sampler 10, a square root operator 11, a modulator 12, an ultrasonic signal source 13, a digital to analog converter 14 and an ultrasonic transducer 15.

The audio apparatus 2 is a parametric device that radiates an inaudible ultrasonic pressure wave with an audio signal modulated onto the ultrasonic pressure wave. The transmitted ultrasonic wave interacts with air (i.e. a compressible non-linear medium) to cause the ultrasonic wave to self-demodulate, thereby causing the modulated audio signal to become audible.

Digital signal 23 is provided to double integration filter 7, which boosts the low frequencies by 12 dB/octave akin to integrating the signal twice. Double integration filter 7 compensates for the effects of coloration that occur during the self-demodulation process, and is linear in nature. Typically, the double integration filter 7 is a simple recursive filter. The double integration filter 7 provides the double integrated digital signal 24 to transducer response filter 8.

The transducer response filter 8 corrects for characteristics of the ultrasonic transducer 15, as described in detail below. The transducer response filter 8 provides the corrected signal 25 to DC up-shifter 9.

The DC up-shifter 9 re-scales the data and shifts the voltage of the corrected digital signal 25 so that all signal voltages are positive, thus ensuring the square root operation only has to work on positive values, thereby avoiding complex filtering.

The DC up-shifted signal 26 is provided to up-sampler 10. The up-sampler 10 re-samples the 8 kHz signal at typically 120 kHz. The purpose of up-sampler 10 is to increase the frequency range of the signal in preparation for the square rooting of the signal. A consequence of square rooting the received signal is the creation of an infinite series of harmonics. For distortion to be eliminated all these harmonics must be reproduced. Therefore, to ensure harmonics above 4 kHz are reproduced, the signal is re-sampled at a higher frequency. Sample rates other than 120 kHz may be used dependent on the operating frequencies of the ultrasonic transducer. The re-sampled signal 27 is provided to the square root operator 11.

The square rooting operator 11 compensates for the effects of distortion that occur during the self-demodulation process, and is non-linear in nature.

The square root operator 11 is typically performed by means of a look up table, as is well known to a person skilled in the art.

The square rooted signal 28 is provided to modulator 12 for modulation with an ultrasonic signal 29 from ultrasonic signal source 13. To minimize the risk of harm to humans or animals, the ultrasonic frequency should be higher than approximately 40 kHz. Due to increased signal absorption by the air at higher frequencies the upper highest feasible frequency limit is typically of the order of 200 kHz.

The digital modulated ultrasonic signal 30 is provided to digital to analog converter 14 for converting the digital signal 30 to a representative analog signal. The analog modulated ultrasonic signal 31 is provided to ultrasonic transducer 15. Transducer 15 radiates the modulated ultrasonic signal as an inaudible ultrasonic pressure wave.

To obtain the required ultrasonic pressure levels required for self-demodulation to occur, the transducer 15 will typically be chosen to have its resonance frequency at the frequency of the ultrasonic carrier signal 29.

Figure 2:
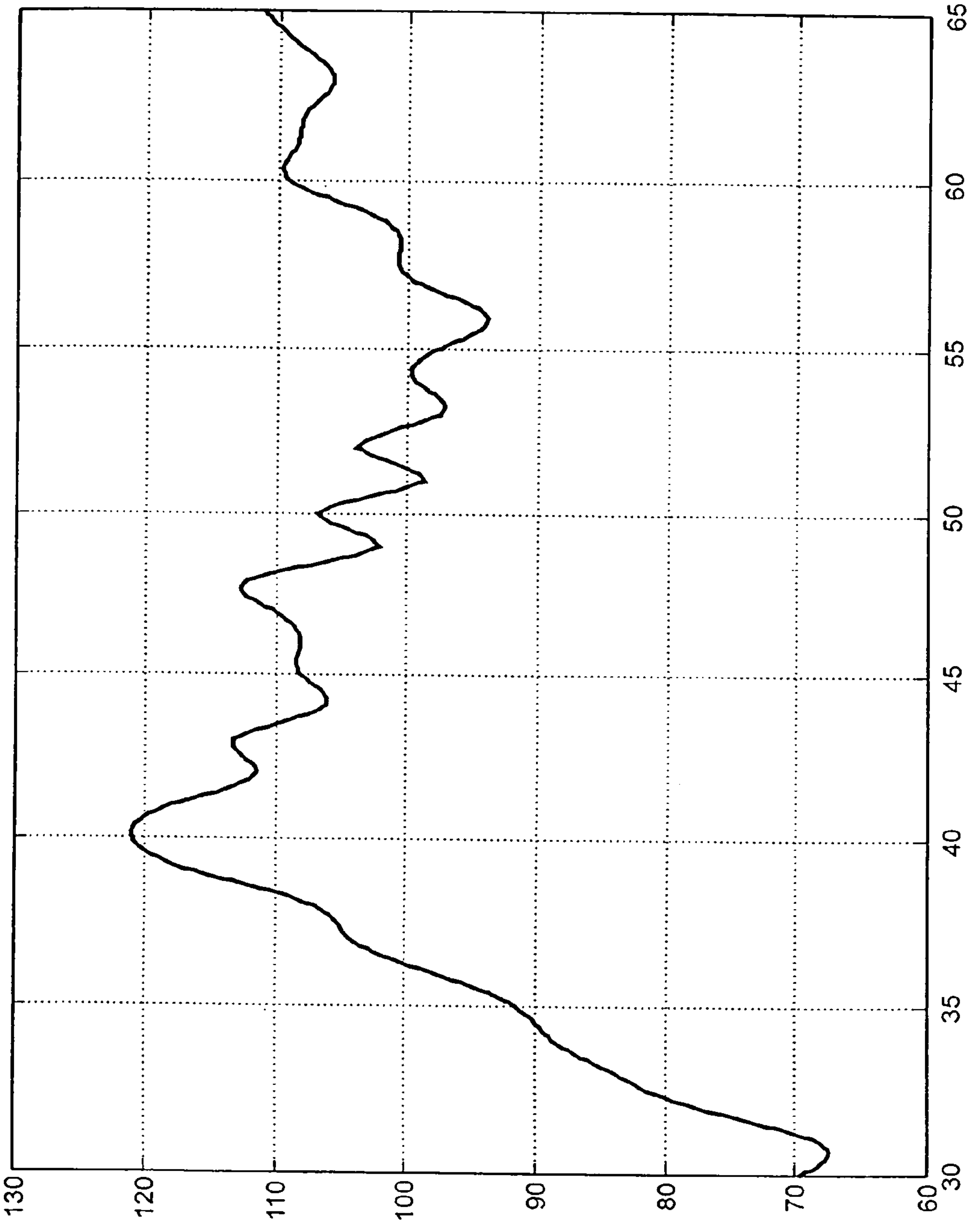
FIG. 2 shows a typical measured frequency response of a suitable transducer for use in audio apparatus according to an embodiment of the present invention.

For a 40 kHz ultrasonic signal a suitable transducer is the MuRata MA4OB8S. This transducer has a frequency response as shown in FIG. 2, which has a narrow resonance band at 40 kHz. To obtain the required power levels a plurality of transducers will typically be required, for example 19 transducers will provide 55 dB's of audio speech signal.

As the square root operator 11 is non-linear, it is not possible for the 15 transducer response filter 8 to have a single optimum filtering characteristic for all frequencies. Therefore, the transducer response filter 8 is determined empirically for a required frequency range. For example, if the resultant spectra of the self-demodulated signal shows a gradual power drop from 300 Hz to 4 kHz after correction for self-demodulation, the transducer response filter 8 is selected to boost the signal over this frequency range. The characteristics of the transducer response filter are therefore, typically, the inverse response of the resultant spectra of the self-demodulated signal. The transducer response filter is designed typically using a recursive filter design package, for example the Yule-Walk package, which models the transducer response filter characteristics using the inverse of the self-demodulated signal.

Typically the transducer response filter characteristics are determined during the manufacture of the audio device. However, it is possible for the characteristics of the transducer response filter to be determined dynamically, for example while during use of the audio device.

Figure 1:
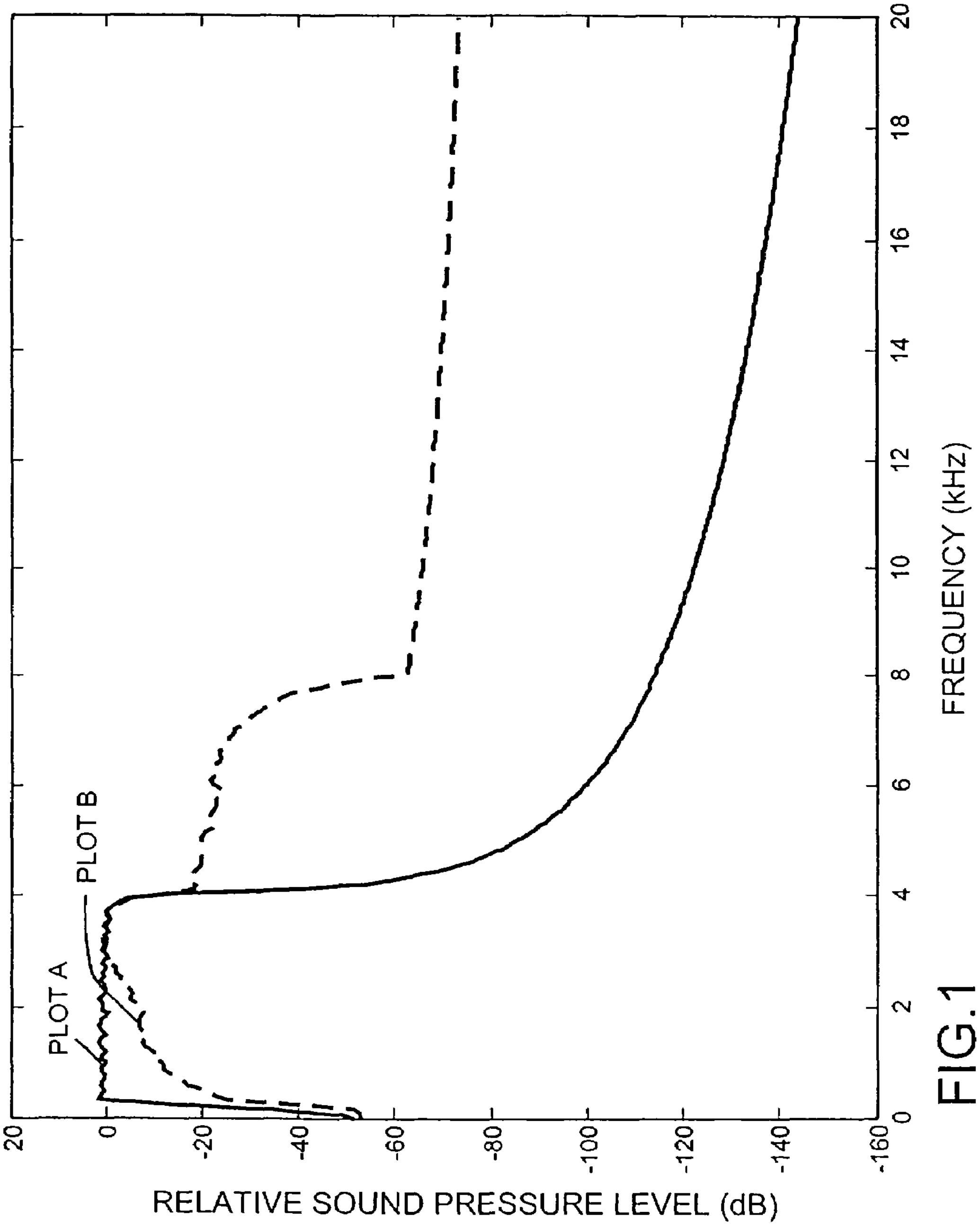
FIG. 1, plot A shows the frequency spectrum of a test audio input signal to an audio apparatus according to one embodiment of the present invention.
Figure 5:
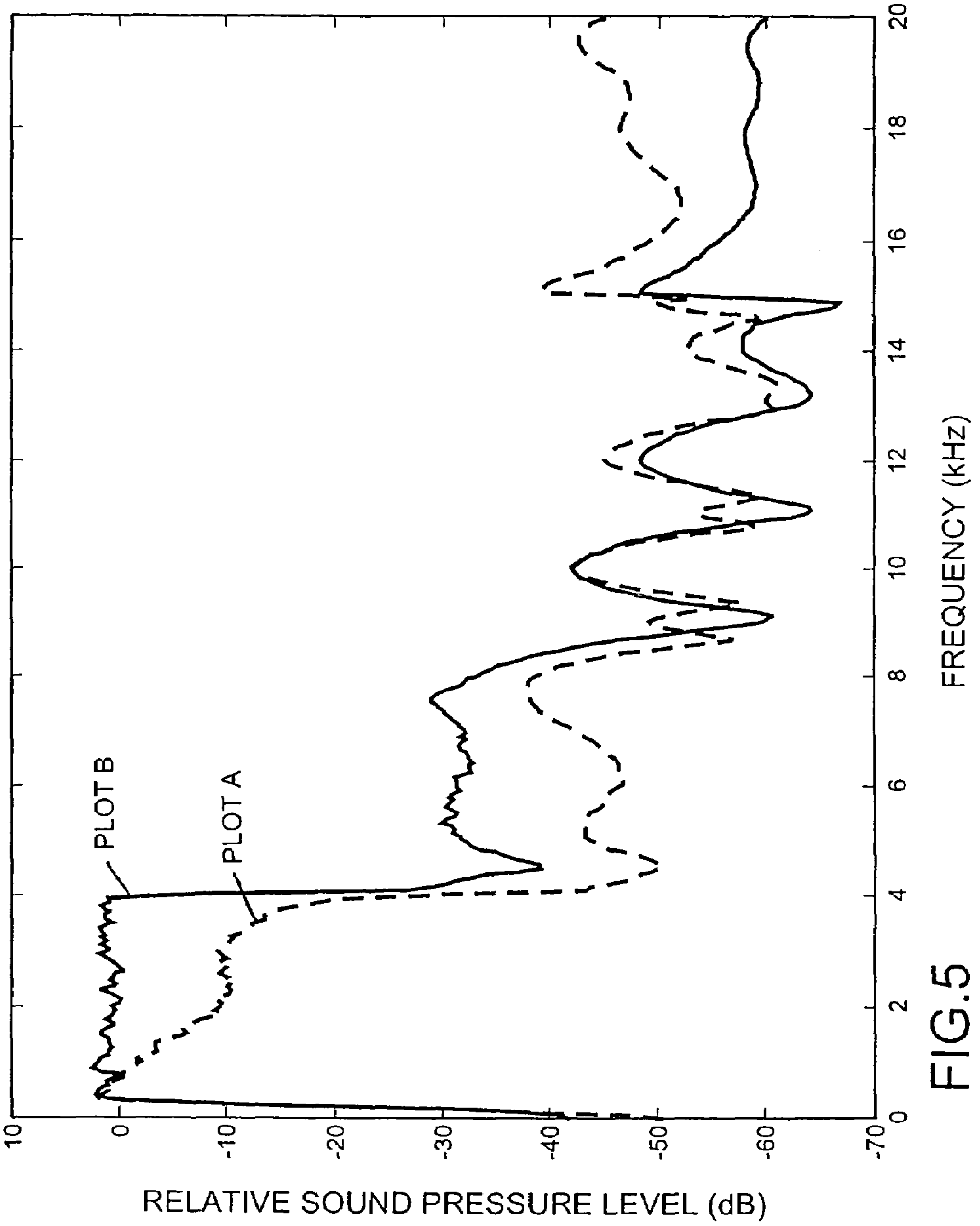
FIG. 5, plot A shows the frequency spectrum of the test audio signal output after self-demodulation with correction for self-demodulation.

FIG. 5, plot A shows the transducer conversion effect upon the input signal shown in FIG. 1, plot A. FIG. 5, plot B shows the corrected spectrum using a transducer response filter 8 empirically derived using FIG. 5, plot A for determining the effect of the transducer conversion. For different frequency and modulation depths the square root non-linear operator 11 will vary the effects of the transducer conversion and accordingly different frequency and modulation depths will require the transducer response filter 8 to be modified empirically as described above.

The transducer response filter 8 is typically a simple recursive filter.

The present invention may include any novel feature or combination of features disclosed herein either explicitly or implicitly or any generalization thereof irrespective of whether or not it relates to the presently claimed invention or mitigates any or all of the problems addressed. In view of the foregoing description it will be evident to a person skilled in the art that various modifications may be made within the scope of the invention. The applicant hereby gives notice that new claims may be formulated to such features during prosecution of this application or of any such further application derived therefrom. For example, it will be appreciated that an analog audio signal can be processed and modulated with an ultrasonic carrier signal, also that the pre-processing filters and/or operator can be used to process the audio signal after modulation of the audio signal.

What is claimed is:

1. An audio apparatus comprising a modulator for modulating a first ultrasonic signal with an audio signal to provide a second ultrasonic signal lying within a first frequency range; a transducer for converting the second ultrasonic signal into an ultrasonic pressure wave for transmission into a non-linear medium to allow demodulation of the ultrasonic pressure wave and thereby generate an audio pressure wave representative of the audio signal wherein the transducer has conversion characteristics that determine how an amplitude of the ultrasonic pressure wave varies with an amplitude of the second ultrasonic signal across the first frequency range; processing means for modifying the audio signal to compensate for the demodulating properties of the non-linear medium; and means for modifying the audio signal to compensate for a variation, with frequency, of the conversion characteristics of the transducer across the first frequency range.

2. An audio apparatus according to claim 1, wherein the first ultrasonic signal is amplitude modulated with the audio signal.

3. An audio according to claim 1, wherein the first ultrasonic signal is equal to or greater than 40 kHz.

4. An audio apparatus according to claim 1, wherein the processing means comprises a double integration filter and a square root operator.

5. An audio apparatus according to claim 4, wherein the means for modifying is disposed between the double integration filter and the square root operator.

6. An audio apparatus according to claim 1, wherein the means for modifying is a digital filter.

7. An audio apparatus according to claim 1, wherein the characteristics of the means for modifying are empirically derived by tone adjustment.

8. An audio apparatus according to claim 1 comprising a radiotelephone.

9. An audio apparatus according to claim 1 comprising a portable radio device.

10. An audio apparatus according to claim 1, wherein a resonant frequency of the transducer is in the first frequency range.

11. An audio apparatus according to claim 1, wherein the compensation for the variation with frequency of the conversion characteristics across the first frequency range is determined empirically.

12. A method for transmitting an ultrasonic pressure wave into a non-linear medium for demodulation comprising:

modulating a first ultrasonic signal with an audio signal to provide a second ultrasonic signal;

converting, using a transducer having conversion characteristics, the second ultrasonic signal into a ultrasonic pressure wave for transmission into a non-linear medium for demodulation and consequent generation of an audio pressure wave representative of the audio signal;

modifying the audio signal, before modulating the first ultrasonic signal, to compensate for the demodulation properties of the non-linear medium; and modifying the audio signal, before modulating the first ultrasonic signal, to compensate for the conversion characteristics of the transducer.

13. Audio apparatus comprising a modulator for modulating a first ultrasonic signal with an audio signal to provide a second ultrasonic signal lying within a first frequency range; a transducer for converting the second ultrasonic signal into an ultrasonic pressure wave for transmission into a non-linear medium to allow demodulation of the ultrasonic pressure wave and thereby generate an audio pressure wave representative of the audio signal wherein the transducer has conversion characteristics that determine how an amplitude of the ultrasonic pressure wave varies with an amplitude of the second ultrasonic signal across the first frequency range; processing means for modifying the audio signal to compensate for the demodulating properties of the non-linear medium; and a digital filter for modifying the audio signal to compensate for a variation, with frequency, of the conversion characteristics of the transducer across the first frequency range.

14. An audio according to claim 13, wherein the first ultrasonic signal is equal to or greater than 40 kHz.

15. An audio apparatus according to claim 14, wherein the processing means comprises a double integration filter and a square root operator.

16. An audio apparatus according to claim 15, wherein the means for modifying is disposed between the double integration filter and the square root operator.

17. An audio apparatus according to claim 13, wherein the characteristics of the means for modifying are empirically derived by tone adjustment.

18. An audio apparatus according to claim 13 comprising a radiotelephone.

19. An audio apparatus according to claim 13 comprising a portable radio device.

20. An audio apparatus according to claim 13, wherein a resonant frequency of the transducer is in the first frequency range.

21. An audio apparatus according to claim 13, wherein the digital filter has empirically determined characteristics that compensate for the variation with frequency of the conversion characteristics across the first frequency range.

* * * * *